ABSTRACT OF THE DISCLOSURE

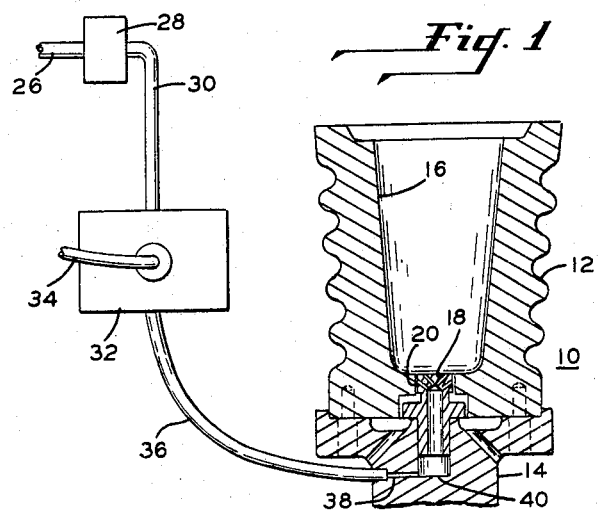
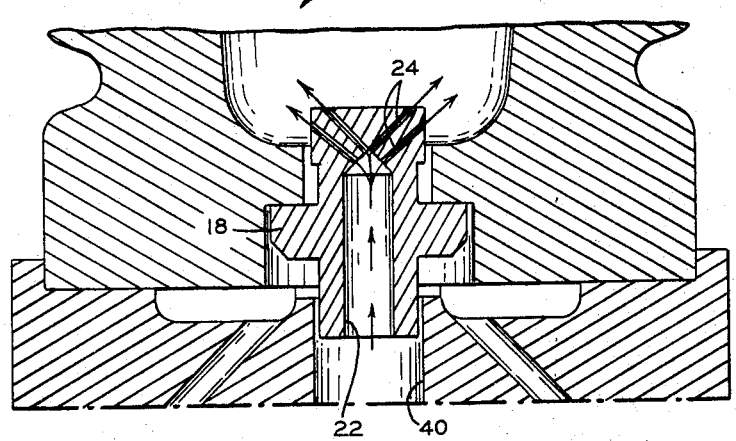
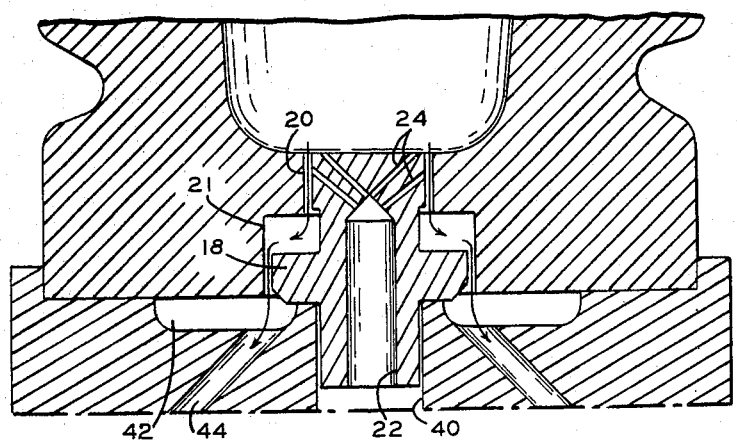
INVENTOR
DANIEL J. LICHOK
GEORGE C. MAXWELL
ATTORNEY 3,480,422
LUBRICATION SYSTEM FOR A PARISON BLANK
Daniel J. Lichok, Lancaster, Pa., and George C. Maxwell, Waxahachie, Tex., assignors to Armstrong Cork Company, Lancaster, Pa., a corporation of Pennsylvania
Filed Dec. 23, 1966, Ser. No. 604,266
Int. Cl. C03b 39/00
U.S. Cl. 65—169                    1 Claim

An apparatus and method for lubricating the molds of a glass molding machine. A pop-up valve in the closed end of the mold cavity sprays lubricant onto the sidewalls of of the mold cavity prior to insertion of the glass gob into the mold cavity.

BACKGROUND OF THE INVENTION

Field of the invention

The present invention relates to the lubrication of glass molds in the machine manufacture of glass articles and, in particular, to the method and apparatus by which the molds are lubricated by a spray of lubricant through a valve arrangement in the base of the mold cavity.

Description of the prior art

The glass molds were previously lubricated by a spray of atomized lubricant being directed into the top of the mold cavity in the manner shown in the patent to Keller, Patent No. 3,141,752. The prior art techniques would require a spray nozzle that is movable above and away from the top of the mold cavity or would require elaborate nozzle structures as seen in the Keller patent which permit the passage of the glass gob. The invention here requires no spray nozzle structure above the mold cavity which may obstruct the movement of the glass gob into the mold cavity. Furthermore, this method of lubricating glass mold cavities eliminates the oil mist in the air around the molding machine. Such oil mists are characteristic of many prior art molding machines and are undesirable because of their contamination of the air and coating of all surrounding areas with a slippery oil film.

SUMMARY OF THE INVENTION

The object of the apparatus and method of this invention is to secure adequate lubrication of glass molds without the generation of an oil mist in the area surrounding the mold and without the use of complex spray nozzles above the mold cavity.

The apparatus involves the use of a pop-up valve in the base or closed end of the mold cavity for supplying lubricant to the inside walls of the mold cavity. The pop-up valve in its raised position sprays lubricant into the mold cavity. The valve in its lowered position operates as a vent for the mold cavity.

The method of this invention encompasses the concept of lubricating a mold cavity by a lubrication structure within the cavity and set to operate in a time sequence relative to the insertion of the glass gob.

BRIEF DESCRIPTION OF THE DRAWING

FIGURE 1 is a schematic view of the glass mold;
FIGURE 2 is a view of the mold with the valve in its upward position; and
FIGURE 3 is a view of the mold with the valve in its downward position.

DESCRIPTION OF THE PREFERRED EMBODIMENT

Referring to FIG. 1, a mold cavity 10 is formed from a mold blank 12 and blank stool 14. The mold blank 12 has a cavity 16 contoured to shape the glass gob and capable of receiving the glass for molding in the conventional manner.

The stool 14 carries the pop-up valve 18 which moves upward and downward in an opening 20 at the base of the mold blank.

FIG. 2 shows the valve 18 with its central lubricating medium passage 22 communicating with a plurality of distribution passages 24 located at the top of the valve. The distribution passages are usually 12 in number, six exiting from the top face of the valve and six exiting from the side of the valve. The source of supply for the lubricating medium is a conventional air fogging system. This comprises a supply line 26 feeding clean dry air into a fog unit 28 from which a line 30 carries the combined air and atomized oil forming the lubricating medium. An air operated lubrication valve 32 controlled by air supply line 34 periodically discharges the lubricating means through line 36 to passages 38 and 40 in the stool 14.

Air supply line 34 is controlled by a timing drum arrangement to periodically supply a charge of air to the air operated lubrication valve 32. The lubrication valve 32 permits the passage of lubricating medium in response to the air charges from line 34. The timing of the air charges from line 34 is timed in relationship to the charging of the glass gob to the mold cavity 16.

FIG. 2 shows the position of the valve 18 during the lubrication phase. The lubrication medium coming into passageway 40 of the stool 14 lifts the valve 18 to its raised position. The lubrication medium also passes up valve passageway 22 and out passageways 24 to spray a lubricating fog into the mold cavity 16. When the air operated valve 32 shuts off the flow of the lubricating medium, valve 18 drops back to its lowermost position as shown in FIG. 3. The placing of the glass gob in the upper portion of the mold cavity 16 traps a body of air in the lower portion of the mold cavity. This air is vented from the mold cavity in the manner shown in FIG. 3. The clearance between the valve 18 and the openings 20 and 21 in the base of the mold blank allow the air to escape into chamber 42 and then via passageway 44 to the exterior of the stool 14.

Consequently, the valve 18, when it moves to its raised position, performs the function of lubricating the mold cavity and in its lowered position allows the venting of entrapped air from within the mold cavity to the atmosphere.

Since certain changes may be made in the above device and different embodiments of the invention can be made without departing from the scope thereof, it is intended that all matter contained in the above description or shown in the accompanying drawings shall be interpreted as illustrative and not in a limiting sense.

We claim:
1. In a mold cavity for receiving charges of molten glass which are then formed to a desired shape, the improvement comprising, means for directing a lubricating medium onto the mold cavity walls from the closed end of the mold cavity, said means for directing lubricating medium consisting of a pop-up valve means located in an opening in the end of the mold cavity opposite from the feed end of the cavity, said pop-up valve means being positioned so that in its downward position it is outside of the mold cavity and in its raised position it is within the mold cavity, said valve means having a plurality of opening means through which the lubricating medium passes, said opening means in the valve means being so positioned that they provide for proper distribution of the lubricating means to the cavity walls only when the valve is in its raised position, means supplying a lubricating medium to the valve means and clearance means being provided between the pop-up valve and mold body to vent the mold cavity.

References Cited
UNITED STATES PATENTS

| | | | |
|---|---|---|---|
| 1,046,867 | 12/1912 | Schies | 65—234 |
| 1,693,069 | 11/1928 | Cramer | 65—355 XR |
| 2,081,858 | 5/1937 | Howard | 65—234 |
| 2,410,422 | 11/1946 | Breene et al. | 65—169 |
| 3,141,752 | 7/1964 | Keller | 65—25 |

FRANK W. MIGA, Primary Examiner

U.S. Cl. X.R.

65—24, 25, 26, 170, 208, 234